United States Patent [19]
Uryu et al.

[11] Patent Number: 4,710,547
[45] Date of Patent: Dec. 1, 1987

[54] PROCESS FOR PRODUCING THREE-DIMENSIONALLY CROSSLINKED POLYESTER HAVING THE LIQUID CRYSTAL STRUCTURE

[75] Inventors: Toshiyuki Uryu; Takashi Kato, both of Tokyo, Japan

[73] Assignee: Celanese Corporation, New York, N.Y.

[21] Appl. No.: 867,997

[22] Filed: May 29, 1986

[30] Foreign Application Priority Data

Sep. 25, 1985 [JP] Japan ................................ 60-211951

[51] Int. Cl.$^4$ ............................................ C08G 63/76
[52] U.S. Cl. .................................... 525/437; 525/418; 528/176; 528/179; 528/272; 528/274
[58] Field of Search ................................ 528/176–179, 528/272–274; 525/437, 418

[56] References Cited

U.S. PATENT DOCUMENTS

| | | | |
|---|---|---|---|
| 4,325,903 | 4/1982 | Wissbrun et al. | 264/176 R |
| 4,358,391 | 11/1982 | Finkelmann et al. | 252/299.01 |
| 4,388,453 | 6/1983 | Finkelmann et al. | 525/15 |
| 4,438,236 | 3/1984 | Cogswell et al. | 525/165 |
| 4,581,399 | 4/1986 | Yoon | 524/246 |
| 4,619,975 | 10/1986 | Matzner et al. | 525/437 |

*Primary Examiner*—Lucille M. Phynes
*Attorney, Agent, or Firm*—Burns, Doane, Swecker & Mathis

[57] ABSTRACT

A polyester, being capable of the anisotropic property in the molten state and a thermotropic liquid crystals, or a composition comprising a low molecular weight polyester and a thermotropic crosslinked, while having the structure of liquid crystals, by a crosslinking reaction with a compound having at least three reactive groups. The reactive group preferably includes hydroxy, carboxyl, amino, amide, carbodiimide, isocyanate, carbamate, epoxy and ester.

8 Claims, No Drawings

PROCESS FOR PRODUCING THREE-DIMENSIONALLY CROSSLINKED POLYESTER HAVING THE LIQUID CRYSTAL STRUCTURE

The present invention relates to a process for producing a three-dimensionally crosslinked polyester having the liquid crystal structure by incorporating a thermotropic liquid crystal polyester which exhibits the anisotropy in the molten state or a polyester composition which is a thermotropic liquid crystal mixture composed of a polyester and a low-molecular weight compound, with a compound having at least three functional groups, whereby crosslinking said liquid crystal polymer or polymer composition. In other words, the present invention relates to a new process for immobilizing the liquid crystal structure.

It is known that a polyester having the rigid main chain and proper molecular structure takes on an anisotropic molecular arrangement in the heated molten state, or becomes a liquid crystal. This polyester is called a thermotropic liquid crystal polyester. Many thermotropic liquid crystal polyesters of various molecular structures were reported in papers and patents. Typical examples are found in Advances in Polymer Science Vol. 59, 60, and 61 (1984) and Japanese Patent Laid-open Nos. 50594/1979, 50173/1980, 29819/1983, 8727/1983, 41328/1984, and 38426/1985.

These thermotropic liquid crystal polyesters are thermoplastic polymers, and usually they undergo phase transition represented by solid$\rightleftarrows$anisotropic molten liquid (liquid crystal)$\rightleftarrows$isotropic molten liquid. (In some cases, the phase transition between an anisotropic molten liquid and an isotropic molten liquid may not be observed because the thermal decomposition begins below the phase transition temperature.)

A thermotropic liquid crystal polyester has the anisotropic molecular arrangement in its molten liquid, and this molecular arrangement is kept even in the solid which is formed after melting. Thus the solid has a relatively high strength and high modulus. It is expected that a variety of thermotropic liquid crystal polyesters will be developed in the future because of their good mechanical properties as well as their features of liquid crystal.

A thermotropic liquid crystal polyester is a thermoplastic polymer and it undergoes the above-mentioned phase transition repeatedly each time when temperature goes up and down. If there is a substance which remains solid and keeps the liquid crystal structure at normal temperature or high temperature even when heated or cooled, it would find new uses.

The present invention is intended to immobilize through crosslinking the molecular orientation of a thermotropic liquid crystal polyester or a mixed thermotropic liquid crystal of polyester and low-molecular weight compound in the liquid crystal state.

The present invention relates to a process for producing a three-dimensionally crosslinked polyester having the liquid crystal structure, said process comprising incorporating a thermotropic liquid crystal polyester (a) which exhibits the anisotropy in the molten state or a polyester composition (b) which is a thermotropic liquid crystal mixture composed of a polyester and a low-molecular weight compound, with a compound (c) having at least three functional groups, whereby crosslinking said polyester (a) or polyester composition (b).

The three-dimensionally crosslinked compound having the liquid crystal structure provided by the present invention is obtained by keeping at high temperatures a thermotropic polyester in the liquid crystal state incorporated with a polyfunctional crosslinking compound or a thermotropic polyester mixture in the liquid crystal state incorporated with a polyfunctional crosslinking compound. At high temperatures, the crosslinking compound reacts with the polyester to form a three-dimensionally crosslinked compound, whereby the liquid crystal phase is immobilized. After immobilization, the phase transition does not take place even when the temperature goes up and down. Therefore, the three-dimensionally crosslinked compound will find a wide range of applications because its liquid crystal property is not changed by phase transition.

The three-dimensionally crosslinked compound in which the liquid crystal structure is immobilized is produced preferably from a precursor polyester having an aromatic rings in the main chain. Where a polyester is used alone for the immobilization of the liquid crystal structure, the polyester should be a thermotropic liquid crystal polyester that exhibits anisotropy when it is in the molten state.

The thermotropic liquid crystal polyester (a) used in this invention which forms an anisotropic molten phase has a property that the polymer molecule chains are aligned in regular parallel order when in the molten state. The state of molecule alignment is referred to as the liquid crystal state or the nematic phase of a liquid crystal substance. This kind of polymer is usually composed of monomers which are thin, long, and flat, and highly rigid in the direction of the long axis of the molecule. The monomers have a plurality of chain extension linkages coaxial or parallel with one another.

The existence of the anisotropic molten phase can be confirmed by the conventional method that employs crossed polarizers. To be more specific, it is confirmed by observing a sample placed on a Leitz hot stage under a Leitz polarized light microscope ($\times 40$) in an atmosphere of nitrogen. The above-mentioned polymer is optically anisotropic. In other words, it transmits light when placed between crossed polarizers. If the sample is optically anisotropic, it transmits polarized light even in the static state.

The constituents of the above-mentioned polyester that forms the anisotropic molten phase are as follows:
(1) One or more aromatic or alicyclic dicarboxylic acids.
(2) One or more aromatic, alicyclic, or aliphatic diols.
(3) One or more aromatic hydroxycarboxylic acids.
(4) One or more aromatic thiolcarboxylic acids.
(5) One or more aromatic dithiols or thiolphenols.
(6) One or more aromatic hydroxylamines or diamines.

The polyester that forms the anisotropic molten phase includes the following.
(I) Polyester composed of (1) and (2).
(II) Polyester composed of (3) alone.
(III) Polyester composed of (1), (2), and (3).
(IV) Polythiolester composed of (4) alone.
(V) Polythiolester composed of (1) and (5).
(VI) Polythiolester composed of (1), (4), and (5).
(VII) Polyesteramide composed of (1), (3), and (6).
(VIII) Polyesteramide composed of (1), (2), (3), and (4).

The polyester that forms the anisotropic molten phase also includes polyester carbonates which do not belong to the category of polyesters composed of the above-mentioned constituents. They are composed essentially of 4-oxybenzoyl units, dioxyphenyl units, dioxycarbonyl units, and terephthaloyl units.

The following lists the constituents of the above-mentioned polyesters (I) to (VIII).

The aromatic dicarboxylic acid includes terephthalic acid, 4,4'-diphenyldicarboxylic acid, 4,4'-triphenyldicarboxylic acid, 2,6-naphthalenedicarboxylic acid, diphenylether-4,4'-dicarboxylic acid, diphenylethane-4,4'-dicarboxylic acid, diphenoxybutane-4,4'-dicarboxylic acid, diphenylethane-4,4'-dicarboxylic acid, isophthalic acid, diphenylether-3,3'-dicarboxylic acid, diphenoxyethane-3,3'-dicarboxylic acid, diphenylethane-3,3'-dicarboxylic acid, and naphthalene-1,6-dicarboxylic acid. It also includes alkyl-, alkoxy-, or halogen-substituted products of the above-mentioned aromatic dicarboxylic acid, such as chloroterephthalic acid, dichloroterephthalic acid, bromoterephthalic acid, methylterephthalic acid, dimethylterephthalic acid, ethylterephthalic acid, methoxyterephthalic acid, and ethoxyterephthalic acid.

The alicyclic dicarboxylic acid includes trans-1,4-cyclohexanedicarboxylic acid, cis-1,4-cyclohexanedicarboxylic acid, and 1,3-cyclohexanedicarboxylic acid. It also includes alkyl-, alkoxy-, or halogen-substituted products of the above-mentioned alicyclic dicarboxylic acid, such as trans-1,4-(1-methyl)cyclohexanedicarboxylic acid and trans-1,4-(1-chloro)cyclohexanedicarboxylic acid.

The aromatic diol includes hydroquinone, resrocin, 4,4'-dihydroxydiphenyl, 4,4'-dihydroxytriphenyl, 2,6-naphthalenediol, 4,4'-dihydroxydiphenyl ether, bis(4-hydroxyphenoxy)ethane, 3,3'-dihydroxydiphenyl, 3,3'-dihydroxydiphenyl ether, 1,6-naphthalenediol, 2,2-bis(4-hydroxyphenyl)propane, and 2,2-bis(4-hydroxyphenyl)methane. It also includes alkyl-, alkoxy-, or halogen-substituted products of the above-mentioned aromatic diol such as chlorohydroquinone, methylhydroquinone, 1-butylhydroquinone, phenylhydroquinone, methoxyhydroquinone, phenoxyhydroquinone, 4-chlororesorcin, and 4-methylresorcin.

The alicyclic diol includes trans-1,4-cyclohexanediol, cis-1,4-cyclohexanediol, trans-1,4-cyclohexanedimethanol, cis-1,4-cyclohexanedimethanol, trans-1,3-cyclohexanediol, cis-1,2-cyclohexanediol, and trans-1,3-cyclohexanedimethanol. It also includes alkyl-, alkoxy-, or halogen-substituted products of the above-mentioned aliphatic diol such as trans-1,4-(1-methyl)cyclohexanediol, and trans-1,4-(1-chloro)cyclohexanediol.

The aliphatic diol includes linear or branched diols such as ethylene glycol, 1,3-propanediol, 1,4-butanediol, and neopentyl glycol.

The aromatic hydroxylcarboxylic acid includes 4-hydroxybenzoic acid, 3-hydroxybenzoic acid, 6-hydroxy-2-naphthoic acid, and 6-hydroxy-1-naphthoic acid. It also includes alkyl-, alkoxy-, or halogen-substituted products of the above-mentioned aromatic hydroxycarboxylic acid such as 3-methyl-4-hydroxybenzoic acid, 3,5-dimethyl-4-hydroxybenzoic acid, 2,6-dimethyl-4-hydroxybenzoic acid, 3-methoxy-4-hydroxybenzoic acid, 3,5-dimethoxy-4-hydroxybenzoic acid, 6-hydroxy-5-methyl-2-naphthoic acid, 6-hydroxy-5-methoxy-2-naphthoic acid, 3-chloro-4-hydroxybenzoic acid, 2-chloro-4-hydroxybenzoic acid, 2,3-dichloro-4-hydroxybenzoic acid, 3,5-dichloro-4-hydroxybenzoic acid, 2,5-dichloro-4-hydroxybenzoic acid, 3-bromo-4-hydroxybenzoic acid, 6-hydroxy-5-chloro-2-naphthoic acid, 6-hydroxy-7-chloro-2-naphthoic acid, and 6-hydroxy-5,7-dichloro-2-naphthoic acid.

The aromatic mercaptocarboxylic acid includes 4-mercaptobenzoic acid, 3-mercaptobenzoic acid, 6-mercapto-2-naphthoic, and 7-mercapto-2-naphthoic acid.

The aromatic dithiol includes benzene-1,4-dithiol, benzene-1,3-dithiol, 2,6-naphthalene-dithiol, and 2,7-naphthalene-dithiol.

The aromatic mercaptophenol includes 4-mercaptophenol, 3-mercaptophenol, 6-mercaptophenol, and 7-mercaptophenol.

The aromatic hydroxyamine and aromatic diamine include 4-aminophenol, N-methyl-4-aminophenol, 1,4-phenylenediamine, N-methyl-1,4-phenylenediamine, N,N'-dimethyl-1,4'-phenylenediamine, 3-aminophenol, 3-methyl-4-aminophenol, 2-chloro-4-aminophenol, 4-amino-1-naphthol, 4-amino-4'-hydroxydiphenyl, 4-amino-4'-hydroxydiphenyl ether, 4-amino-4'-hydroxydiphenyl methane, 4-amino-4'-hydroxydiphenylsulfide, 4,4'-diaminophenylsulfide (thiodianiline), 4,4'-diaminodiphenylsulfone, 2,5-diaminotoluene, 4,4'-ethylenedianiline, 4,4'-diaminophenoxyethane, 4,4'-diaminodiphenylmethane (methylenedianiline), and 4,4'-diaminophenyl ether (oxydianiline).

The above-mentioned polymers (I) to (VIII) each composed of the above-mentioned constituents form or do not form the anisotropic molten phase depending on the constituents, the composition of the polymer, and the sequence distribution of the constituents. Only those polymers which form the anisotropic molten phase are used in this invention.

The above-mentioned polyesters (I) to (III) and polyesteramides (VIII) which form the anisotropic molten phase are prepared by various ester forming processes which involve the step of reacting organic monomer compounds with one another which have functional groups to form the required repeating units upon condensation. The functional group of these organic monomer compounds may be a carboxyl group, hydroxyl group, ester group, acyloxy group, acid halide, or amine group. The above-mentioned monomer compounds may be reacted by molten acidolysis in the absence of a heat-exchange fluid. According to this method, the monomers are heated all together to form a molten liquid of the reactants. As the reaction proceeds, solid polymer particles suspend in the liquid. In the final stage of condensation, volatile by-products (e.g., acetic acid and water) may be readily removed by applying a vacuum.

The complete aromatic polyester used in this invention may be formed by the slurry polymerization process. According to this process, the reaction product is obtained in the form of solids suspending in the heat-exchange medium.

In both the molten acidolysis process and the slurry polymerization process, the organic monomer reactants to give the complete aromatic polyester may be made to react in the modified form, with the hydroxyl group esterified (or in the form of lower acyl ester). The lower acyl group is preferably one which has 2 to 4 carbon atoms. Preferably, an acetate ester of the organic monomer reactant is used for the reaction.

The molten acidolysis process or slurry process may employ a catalyst. Typical examples of the catalyst include dialkyltin oxides (such as dibutyltin oxide), diaryltin oxides, titanium dioxide, antimony trioxide, alkoxytitanium silicates, titanium alkoxides, alkali metal salts and alkaline earth metal salts of carboxylic acids (such as zinc acetate), Lewis acids (such as BF₃), and hydrogen halides and other gaseous acids (such as HCl). The catalyst is used in an amount of about 0.001 to 1 wt%, preferably 0.01 to 0.2 wt%, based on the total weight of the monomers.

The preferred complete aromatic polyester used in this invention has a weight-average molecular weight of about 2,000 to 200,000, preferably about 10,000 to 50,000, and more preferably about 20,000 to 25,000. The preferred complete aromatic polyesteramide has a weight-average molecular weight of about 5,000 to 50,000, preferably about 10,000 to 30,000, for example, 15,000 to 17,000. The molecular weight may be determined by gel permeation chromatography or any other standard method which requires no polymer solutions, for example, infrared spectrophotometry which determines the terminal groups for a compression-molded film sample. The molecular weight may also be determined by the light scattering method after dissolution in pentafluorophenol.

The above-mentioned complete polyester and polyesteramide have an intrinsic viscosity (I.V.) of at least about 2.0 dl/g, for example, about 2.0 to 10.0 dl/g, when measured using a 0.1 wt% solution in pentafluorophenol at 60° C.

In the case of the mixture thermotropic liquid crystal (b) composed of a polyester and a low-molecular weight compound, it is preferable that the polyester and low-molecular weight compound are each a thermotropic liquid crystal by itself. However, this is not essential. In permissible instances, either of them is a thermotropic liquid crystal and the mixture as a whole exhibits the liquid crystal structure.

The polyester for the mixture liquid crystal includes a polycarbonate, polyalkylene terephthalate, polyarylate, and polyesteramide, which are used individually or in combination with one another. Preferable among them is one which contains an aromatic compound in a portion of the polymer main chain. Particularly preferable is one which has a good miscibility with a low-molecular weight crystalline compound. Preferred examples include polyaryl carbonates, polybutylene terephthalate, polyethylene terephthalate, polyarylates (aromatic polyesters), and aromatic polyesteramides.

The low-molecular weight compound for the mixture thermotropic liquid crystal (b) composed of a polyester and a low-molecular weight compound includes the liquid crystal compounds described in Handbook of Liquid Crystals, Verlag Chemie (1980), 35 to 113 pages, by Hans Kelker and Rolf Hats. Typical examples are compounds of formula (I) below,

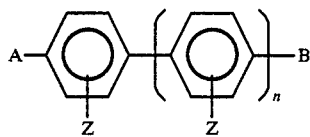

(I)

in which the mesogene is a series of aromatic rings joined to one another without linking radicals;
compounds having the skeleton of formula (II) below,

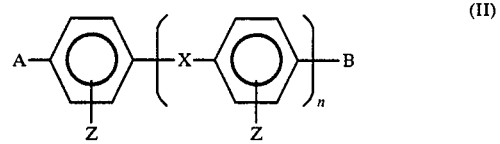

(II)

in which the aromatic rings are joined to one another through a linking radical which is an azomethine, azo compound, azoxy, or carboxylic acidoester compound;
compounds of the above formula (II) in which there are two or more kinds of X; and
compounds having such a structure that formula (I) and formula (II) are joined together.

In the above formulas, A, B, and Z each denotes an alkoxy group, alkoxycarbonyl group, alkylamide group, halogen, hydrocarbon, or hydrogen; and n=0 to 10.

An example of the compounds represented by formula (I) is:

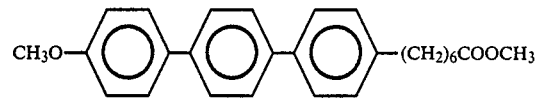

An example of the compounds represented by formula (II) is:

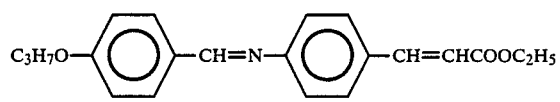

An example of the compounds belonging to the category (III) is:

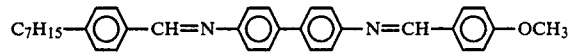

Particularly preferable among these low-molecular weight compounds are those in which the linking radical is a carboxylic acidoester. They are low-molecular weight ester compounds (thermotropic liquid crystal) of the formula below.

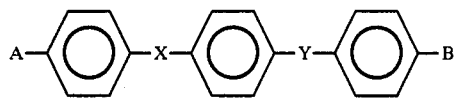

(where X and Y are each an ester linkage,

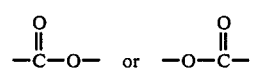

(either of X or Y may be a direct linkage or any other linkage instead of an ester linkage); and A and B are terminal substituent groups such as alkoxy group, alkyl group, halogen, and alkoxycarbonyl group.)

In the above formulas, the hydrogen atoms on the aromatic rings may be partly substituted with a halogen, alkyl group, or alkoxy group. They should preferably be readily miscible with the polyester to be mixed. In addition, they should preferably form a stable liquid crystal phase in the temperature range high enough for the ester interchange reaction to take place. So long as the above-mentioned requirements are met, the low-molecular weight ester compounds may be one which has two or less or four or more aromatic rings, or one in which the aromatic rings are partly or entirely heterocyclic rings or aliphatic rings.

The following are the especially preferable examples.

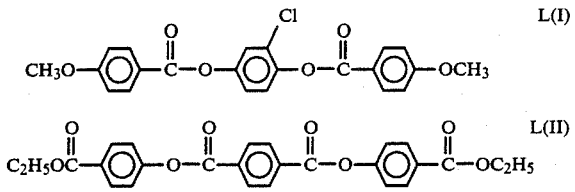

According to this invention, the three-dimensionally crosslinked polyester is obtained by adding a polyfunctional crosslinking compound (c). This compound has three or more functional groups of one or more kinds selected from the group consisting of hydroxyl, carboxyl, amino, amide, carbodimide, isocyanate, carbamate, epoxy, and ester. In general, a polyester becomes three-dimensionally crosslinked upon reaction with a polyfunctional crosslinking compound at high temperatures. This reaction is induced by a carboxylic acid, hydroxyl group, thiol group, or amino group which is an unreacted residue on the molecule terminal; by a hydroxyl group formed by intramolecular ester interchange reaction or intramolecular ester transfer; or by a carboxyl group or hydroxyl group resulting from hydrolysis by residual water. There are many known polyfunctional crosslinking compounds that form the three-dimensionally crosslinked structure. However, some of them are not preferable because they cause residual stress in the resin due to vigorous reactions; give off a gas during the reaction; and are very low in reactivity. Preferred examples of the polyfunctional crosslinking compounds are esters of organic hydroxyl compounds, such as boric esters, phosphoric esters, phosphorous esters, and carboxylic esters. Especially preferable among them are esters of polyhydric phenols (e.g., pyrogallol and phloroglucine) and polyhydric phenyl derivatives; esters of aromatic hydroxy-carboxylic acid such as catechol carboxylic acid and hydroxyphthalic acid; and esters of aromatic polycarboxylic acids such as trimesic acid, trimellitic acid, and pyromellitic acid.

A commonly used catalyst may be used for the crosslinking reaction in the process of this invention. Examples of preferred catalyst include tertiary amines and heterocyclic amines (e.g., imidazole derivatives).

In general, a thermotropic liquid crystal polyester has a higher viscosity and takes a longer time for the relaxation of molecular motion than a low-molecular weight liquid crystal; and therefore, it retains its molecular orientation in the solid after melting.

The three-dimensionally crosslinked polyester in this invention differs from such an ordinary polyester in that the liquid crystal structure is directly immobilized. It may be compared to a glasslike solid in which the liquid crystal state is immobilized. There is an instance where a polyester in the liquid crystal state becomes a glasslike solid without crystallization when it is cooled. However, in the case of the polyester in this invention, the liquid crystal state is positively immobilized by three-dimensional crosslinking; therefore, when heated, the polyester does not melt but remains to be a solid retaining the liquid crystal structure until its decomposition temperature is reached. In addition, according to this invention, the liquid crystal structure is immobilized also in the mixture composed of a polyester and a low-molecular weight compound. The process of this invention will be able to immobilize in a solid the physical properties of a low-molecular weight liquid crystal.

It is noted in the invention that when a thermotropic liquid crystal polyester or a mixture liquid crystal composed of a thermotropic liquid crystal polyester and a low-molecular weight liquid crystal compound is incorporated with a polyfunctional crosslinking compound, the liquid crystal state is specifically immobilized. The immobilization of liquid crystal prevents the liquid crystal from changing in properties before and after the phase transition. It permits the liquid crystal to be used over a broad temperature range without any change of properties. The crosslinked liquid crystal will find use as a gas separation membrane and the like.

The invention is now described in more detail with reference to the following examples, which are not intended to limit the scope of this invention.

The liquid crystal polymers used in the examples have the skeletons as shown in Table 1 below.

TABLE 1

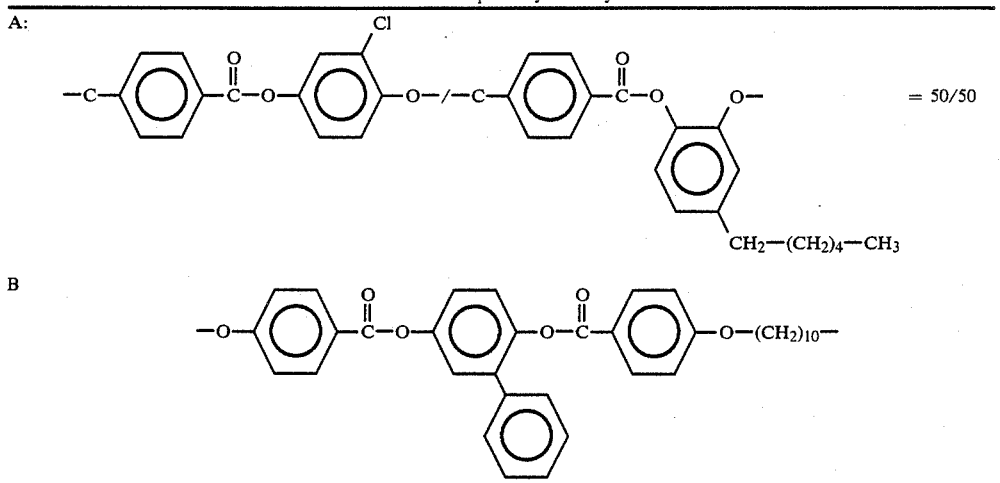

TABLE 1-continued
Skeletons of Liquid Crystal Polymers

C: 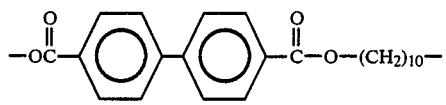

D: 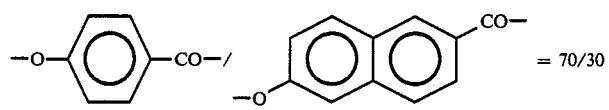 = 70/30

E: 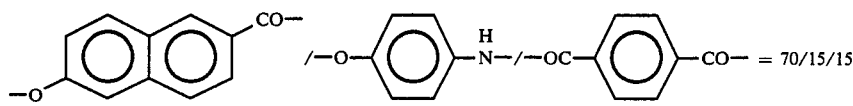 = 70/15/15

The liquid crystal polymers were prepared in the following manner.

A: Prepared by polycondensation of hexylresorcinol (HR), chlorohydroquinone (CHQ), and terephthalic acid in a mixture of tetrachloroethane and pyridine at room temperature for 24 hours. The molar ratio of CHQ to HR was 40/60. The resulting copolyester had a melting point of 260° C.

B: Prepared according to the process described in Macromol. Chem. Rapid Commun., Vol. 3, p. 23 (1982), by R. W. Lenz et al.

C: Prepared according to the process described in polymer J., Vol. 13, p. 55 (1981), by P. Neurisse et al.

D: Prepared according to the process disclosed in Japanese Patent Laid-open No. 77691/1979.

E: Prepared according to the process disclosed in Japanese Patent Laid-open No. 1722/1983.

The low-molecular weight liquid crystal compound used in the liquid crystal mixture was the above-mentioned compound L(I) or L(II). They were prepared in the following manner.

L(I): Prepared according to the process described in J. Am. Chem. Soc., Vol. 97, p. 6662 (1975), by M. J. S. Dewar and A. C. Griffin.

L(II): Prepared according to the process described in Macromol Chem., Vol. 183, p. 2693 (1982), by R. W. Lenz et al.

The polyfunctional crosslinking compounds used in the examples were compounds C(I) and C(II) each having the following structure.

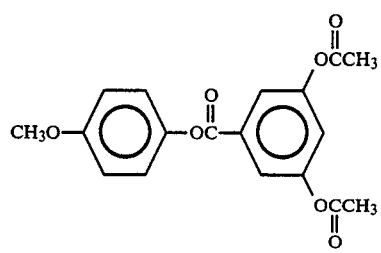 C(I)

The compound C(I) was synthesized by acetylizing 3,5-dihydroxybenzoic acid and then converting the acetylized product into a p-methoxyphenyl ester.

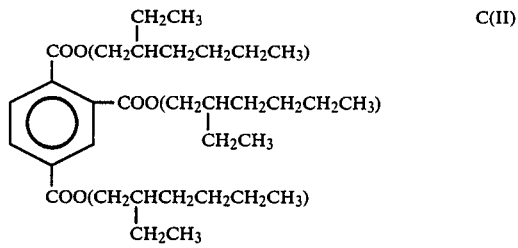 C(II)

The compound C(II) was tri(2-ethylhexyl)trimellitic ester made by Daihachi Chemical Co., Ltd.

As the polyesters exhibiting no liquid crystal properties, polyarylate (made by Unitica) and polybutylene terephthalate (made by Polyplastic) were used.

COMPARATIVE EXAMPLE 1

The liquid crystal polymer A shown in Table 1 was examined for melting point by differential thermal analysis. The exotherm peak was 260° C. The polymer was heated and melted slowly on a hot stage and the liquid crystal pattern was observed under a polarization microscope. At 260° C., it exhibited a pattern characteristic of nematic liquid crystal, and at 300° C., it began to slowly decompose but retained its thready structure characteristic of nematic liquid crystal until the decomposed portion became invisible. This observation is discussed in detail by Uematsu et al. in Kobunshi, Vol. 31, No. 3, pp. 248–255 (1982). According to thermal differential analysis, any peak resulting from the phase change was not observed in the temperature range from 260° C. to 300° C. Furthermore, as the molten polymer A was slowly cooled, it lost the liquid crystal pattern at 260° C. and returned to the crystalline state.

COMPARATIVE EXAMPLE 2

The liquid crystal polymer A (20 wt%) was mixed with the low-molecular weight liquid crystal compound L(I) (80 wt%).

Incidentally, the low-molecular weight liquid crystal compound L(I) has the following properties when measured in the same manner as in Comparative Example 1. It has a melting point at 160° C. It has the nematic phase. It has a phase transition point at 253° C., at which it changes into an isotropic liquid. At the phase transition point, it gives a peak in thermal differential analysis and it also gives an isotropic island resulting from the partial change of the nematic pattern into the isotropic phase. The isotropic island is invisible under a polarization microscope. (See Tables 2 and 3.)

The resulting mixture had a peak at 163° C. attributable to the low-molecular weight compound, a melting point at 200° C., and a phase transition point at 275° C. from the nematic phase to the isotropic phase. Measurements were carried out using a differential thermal analyzer and a polarization microscope. When cooled, the mixture behaved in the same manner as in Comparative Example 1, giving rise to phase transition.

TABLE 2

Melting Point and Transition Point of Low-Molecular Weight Liquid Crystal Compound

| | $T_{K-L}$ (°C.) | $T_{L-I}$ (°C.) |
|---|---|---|
| L (I) | 160 | 253 |
| L (II) | 196 | 241 |

$T_{K-L}$: Melting point at which transition from crystalline phase to liquid crystal phase takes place.
$T_{L-I}$: Phase transition point at which transition from liquid crystal phase to isotropic molten liquid takes place.

TABLE 3

Melting Point and Transition Point of Polymers

| | $T_{K-L}$ (°C.) | $T_{L-I}$ (°C.) |
|---|---|---|
| Polymer A | 260 | — |
| Polymer B | 151 | 168 |
| Polymer C | 154 | 160 |
| Polymer D | 280 | — |
| Polymer E | 286 | — |
| Polybutylene terephthalate | 228 | — |

EXAMPLE 1

The mixture obtained in Comparative Example 2, which is composed of polymer A and low-molecular weight liquid crystal compound L(I) at a ratio of 20:80 by weight, was incorporated with 2 wt% of a crosslinking compound C(I) while the mixture was kept at 250° C. on a hot plate. The temperature was lowered to 200° C. and this temperature was maintained for 30 minutes. The crosslinked mixture was found to have no melting point nor phase transition point when examined in the same manner as mentioned above. When heated, it began to decompose at about 300° C. When cooled again to room temperature, it did not exhibit the pattern change resulting from phase transition and the change in differential thermal analysis resulting from phase transition. The pattern showing the liquid crystal property remained unchanged. These findings suggest that the liquid crystal is immobilized by the crosslinking compound, and the state of liquid crystal is maintained.

EXAMPLES 2 TO 10 AND COMPARATIVE EXAMPLES 3 TO 10

Different kinds of liquid crystal polymer compositions were prepared according to the combinations shown in Table 4. The resulting compositions were examined for $T_{K-L}$ and $T_{L-I}$ in the same manner as in Example 1. The results are also shown in Table 4.

TABLE 4

Effect of Crosslinking by Addition of Crosslinking Compound

| | Composition | | | | |
|---|---|---|---|---|---|
| | Polymer | Low mol. weight liquid crystal compound | Crosslinking compound | $T_{K-L}$ (°C.) | $T_{L-I}$ (°C.) |
| Comparative Example 1 | A | — | — | 260 | — |
| Comparative Example 2 | A | L (I) | — | 165 | 275 |
| Example 1 | A | L (I) | C (I) | — | — |
| Comparative Example 3 | A | L (II) | — | 199 | 270 |
| Example 2 | A | L (II) | C (I) | — | — |
| Comparative Example 4 | B | L (I) | — | 162 | 251 |
| Example 3 | B | L (I) | C (I) | — | — |
| Comparative Example 5 | C | L (I) | — | 162 | 253 |
| Example 4 | C | L (I) | C (III) | — | — |
| Comparative Example 6 | D | L (I) | — | 165 | 258 |
| Example 5 | D | L (I) | C (I) | — | — |
| Comparative Example 7 | E | L (I) | — | 165 | 290 |
| Example 6 | E | L (I) | C (I) | — | — |
| Comparative Example 8 | Polybutylene terephthalate | L (I) | — | 165 | 253 |
| Example 7 | Polybutylene terephthalate | L (I) | C (I) | — | — |

What is claimed is:

1. A process for producing a three-dimensionally crosslinked polyester having the liquid crystal structure, said process comprising incorporating a thermotropic liquid crystal polyester (a) which exhibits the anisotropy in the molten state or a polyester composition (b) which is a thermotropic liquid crystal mixture composed of a polyester and a low-molecular weight compound, with a compound (c) having at least three functional groups, whereby crosslinking said polyester (a) or polyester composition (b).

2. A process for producing a three-dimensionally crosslinked polyester as set forth in claim 1, wherein the compound (c) having at least three functional groups has one or more kinds of functional groups selected from the group consisting of hydroxyl, carboxyl, amino, amide, carbodimide, isocyanate, carbamate, epoxy, and ester groups.

3. A process for producing a three-dimensionally crosslinked polyester as set forth in claim 1, wherein the compound (c) having at least three functional groups has a functional group of ester.

4. A process for producing a three-dimensionally crosslinked polyester as set forth in claim 1, wherein the thermotropic liquid crystal mixture composed of a polyester and a low-molecular weight compound contains a low-molecular weight compound which exhibits the liquid crystal properties.

5. A process for producing a three-dimensionally crosslinked polyester as set forth in claim 4, wherein the low-molecular weight compound is one which exhibits the nematic liquid crystal properties.

6. A process for producing a three-dimensionally crosslinked polyester as set forth in claim 4, wherein the low-molecular weight compound is one which has a molecular weight lower than 2,000.

7. A process for producing a three-dimensionally crosslinked polyester as set forth in claim 6, wherein the low-molecular weight compound is one which is represented by the formula below.

(where X and Y denote the ester linkage and A and B are each an alkoxy group, alkyl group, alkoxycarbonyl group, or halogen.)

8. A process for producing a three-dimensionally crosslinked polyester as set forth in claim 4, wherein the polyester is one or more kinds selected from the group consisting of polycarbonate, polyalkylene terephthalate, polyacrylate, and polyester polyamide.

* * * * *

UNITED STATES PATENT OFFICE
CERTIFICATE OF CORRECTION

Patent No. 4,710,547          Dated December 1, 1987

Inventor(s) T. Uryu et al

It is certified that error appears in the above-identified patent and that said Letters Patent are hereby corrected as shown below:

IN THE HEADING

Change the name of the Assignee from "Celanese Corporation" to --Polyplastics Co., Ltd., Osaka, Japan--.

Signed and Sealed this

Third Day of May, 1988

Attest:

DONALD J. QUIGG

Attesting Officer

Commissioner of Patents and Trademarks